United States Patent
Bray et al.

(10) Patent No.: US 7,410,089 B2
(45) Date of Patent: Aug. 12, 2008

(54) METHOD OF MAKING AEROFOIL BLISKS

(75) Inventors: Simon E Bray, Derby (GB); Jonathan P Throssell, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/868,837

(22) Filed: Jun. 17, 2004

(65) Prior Publication Data
US 2005/0006440 A1    Jan. 13, 2005

(30) Foreign Application Priority Data
Jul. 10, 2003    (GB)    ................. 0316158.5

(51) Int. Cl.
*B23K 20/12*    (2006.01)
*B23P 15/04*    (2006.01)

(52) U.S. Cl. .................. 228/112.1; 29/889.21

(58) Field of Classification Search .............. 228/112.1, 228/2.1, 119; 29/889, 889.2, 889.21, 889.3, 29/889.23, 889.6, 889.4, 889.7, 889.1, 889.22; 244/123.1; 416/180, 193 A, 179, 219 R
See application file for complete search history.

(56) References Cited

U.S. PATENT DOCUMENTS

| | | | | |
|---|---|---|---|---|
| 4,934,583 A | * | 6/1990 | Patsfall | 228/44.3 |
| 5,492,581 A | * | 2/1996 | Searle | 156/73.5 |
| 5,791,878 A | * | 8/1998 | Wainauski et al. | 416/223 R |
| 5,797,182 A | | 8/1998 | Furlan | |
| 5,865,364 A | * | 2/1999 | Trask et al. | 228/212 |
| 6,095,402 A | * | 8/2000 | Brownell et al. | 228/112.1 |
| 6,106,233 A | | 8/2000 | Walker | |
| 6,219,916 B1 | * | 4/2001 | Walker et al. | 29/889.21 |
| 6,478,545 B2 | * | 11/2002 | Crall et al. | 416/213 R |
| 6,542,843 B1 | * | 4/2003 | Metzinger et al. | 702/113 |
| 6,669,447 B2 | * | 12/2003 | Norris et al. | 416/224 |
| 6,688,512 B2 | * | 2/2004 | Trask | 228/112.1 |
| 2002/0070492 A1 | | 6/2002 | Collot | |

FOREIGN PATENT DOCUMENTS

| | | |
|---|---|---|
| EP | 0 624 418 A | 11/1994 |
| EP | 0 850 718 A | 7/1998 |
| EP | 0 887 143 A | 12/1998 |
| EP | 0 924 016 A | 6/1999 |
| EP | 1 239 116 A | 9/2002 |
| EP | 1 312 766 A | 5/2003 |

* cited by examiner

*Primary Examiner*—Kevin P Kerns
*Assistant Examiner*—Michael Aboagye
(74) *Attorney, Agent, or Firm*—W. Warren Taltavull; Manelli Denison & Selter PLLC

(57) ABSTRACT

A method of making an aerofoil blisk (10) comprising a plurality of aerofoil blades (12) joined to a disc (14) to extend radially outwardly therefrom includes the step of forming a blade member (28) having a stub (30) for joining to the disc (14), the stub (30) having a taper ratio of less than 2. The stub (30) of the blade member (28) may be joined to the disc (14) by linear friction welding, and excess material may subsequently be machined from the blade member (28) to form the blade (12).

4 Claims, 3 Drawing Sheets

METHOD OF MAKING AEROFOIL BLISKS

FIELD OF THE INVENTION

The invention relates to a method of making aerofoil blisks and to a blade member for use in such a method.

BACKGROUND OF THE INVENTION

An aerofoil blisk comprises a plurality of blades welded onto a disc so as to extend radially outwardly therefrom. Blisks may be used in aero engines both in the compressor and turbine and can be advantageous over conventionally bladed discs.

It is known to join the blades to the disc by linear friction welding, this being a process whereby one part is held stationary while the other part is oscillated against it under load, the heat generated and the applied loads resulting in a weld as material extrudes from the edges of the joint. In the making of blisks, a blade member (which will subsequently be machined to form the finished blade) is oscillated relative to a stationary disc whilst a load is applied in the radial direction of the blade, towards the disc. The blade is thereby joined to the disc. The radially inner end of the blade which joins to the disc is referred to as a stub.

Excess material is subsequently machined away from the blade member, to result in a blade of the desired shape.

SUMMARY OF THE INVENTION

According to the invention there is provided a method of making an aerofoil blisk comprising a plurality of aerofoil blades joined to a disc to extend radially outwardly therefrom, the method including the steps of:

forming a blade member having a stub for joining to the disc, the stub having a taper ratio of less than 2;

joining the stub of the blade member to the disc by linear friction welding; and machining excess material from the blade member to form the blade.

The taper ratio is the ratio of the widest to the narrowest part of the stub in section, measured in the direction of relative oscillation of the stub and the disc during the friction welding process. The section referred to is across the length of the blade, tangentially across the disc.

Preferably the method further includes the step of forming the disc with a projection to which the blade stub is to be joined, the projection having the same sectional shape as the blade stub.

Preferably the linear friction welding process involves oscillating the blade member tangentially relative to the disc.

Preferably the blade member is formed such that the taper ratio of the stub is less than 1.8 and most preferably the taper ratio is less than 1.5.

Preferably the blade member is formed such that the stub has sharp corners in the regions which will form leading and trailing edges of the blade.

Preferably an end of the leading edge region of the stub is defined by a straight edge which is substantially parallel to the oscillation direction. Preferably the straight edge extends between two of the sharp corners.

Preferably an end of the trailing edge region of the stub is defined by a straight edge which is substantially parallel to the oscillation direction. Preferably the straight edge extends between two of the sharp corners.

Preferably the blade member is shaped such that for a given blade shape, the camber of the stub is minimised.

According to the invention there is further provided a method of making an aerofoil blisk comprising a plurality of aerofoil blades joined to a disc to extend radially outwardly therefrom, the method including the steps of:

forming a blade member having a stub for joining to the disc, the stub having straight edges in the regions which will form the leading and trailing edges of the blade;

joining the stub of the blade member to the disc by linear friction welding; and machining excess material from the blade member to form the blade.

Preferably the method further includes the step of forming the disc with a projection to which the blade stub is to be joined, the projection having the same sectional shape as the blade stub.

Preferably the linear friction welding process involves oscillating the blade member tangentially relative to the disc.

Preferably the blade member is formed such that the taper ratio of the stub is less than 2.

Preferably the blade member is formed such that the taper ratio of the stub is less than 1.8 and most preferably the taper ratio is less than 1.5.

Preferably the blade member is formed such that the stub has sharp corners in the regions which will form leading and trailing edges of the blade.

Preferably an end of the leading edge region of the stub is defined by a straight edge which is substantially parallel to the oscillation direction. Preferably the straight edge extends between two of the sharp corners.

Preferably an end of the trailing edge region of the stub is defined by a straight edge which is substantially parallel to the oscillation direction. Preferably the straight edge extends between two of the sharp corners.

Preferably the blade member is shaped such that for a given blade shape, the camber of the stub is minimised. According to the invention there is further provided a blade member for joining to a disc by linear friction welding to form a blisk, the blade member having a stub for joining to the disc, the stub having a taper ratio of less than 2.

Preferably the blade member is adapted for linear friction welding to the disc with the direction of oscillation of the blade relative to the disc being tangentially of the disc.

Preferably the taper ratio of the stub is less than 1.8 and most preferably the taper ratio is less than 1.5.

Preferably the stub has sharp corners in the regions which will form leading and trailing edges of the blade.

Preferably an end of the leading edge region of the stub is defined by a straight edge which is substantially parallel to the oscillation direction of the blade during the friction welding process. Preferably the straight edge extends between two of the sharp corners.

Preferably an end of the trailing edge region of the stub is defined by a straight edge which is substantially parallel to the oscillation direction of the blade during the friction welding process. Preferably the straight edge extends between two of the sharp corners.

Preferably the blade member is shaped such that for a given blade shape, the camber of the stub is minimised.

According to the invention, there is a further provided a blade member for joining to a disc by linear friction welding to form a blisk, the blade member having a stub for joining to the disc, and the stub having straight edges in the regions which will form the leading and trailing edges of the blade.

Preferably the taper ratio of the stub is less than 2.

Preferably the blade member is adapted for linear friction welding to the disc with the direction of oscillation of the blade relative to the disc being tangentially of the disc.

Preferably the taper ratio of the stub is less than 1.8 and most preferably the taper ratio is less than 1.5.

Preferably the stub has sharp corners in the regions which will form leading and trailing edges of the blade.

Preferably an end of the leading edge region of the stub is defined by a straight edge which is substantially parallel to the oscillation direction of the blade during the friction welding process. Preferably the straight edge extends between two of the sharp corners.

Preferably an end of the trailing edge region of the stub is defined by a straight edge which is substantially parallel to the oscillation direction of the blade during the friction welding process. Preferably the straight edge extends between two of the sharp corners.

Preferably the blade member is shaped such that for a given blade shape, the camber of the stub is minimised.

BRIEF DESCRIPTION OF THE DRAWINGS

An embodiment of the invention will be described for the purpose of illustration only with reference to the accompanying drawings in which.

DETAILED DESCRIPTION OF THE INVENTION

Figure 1:
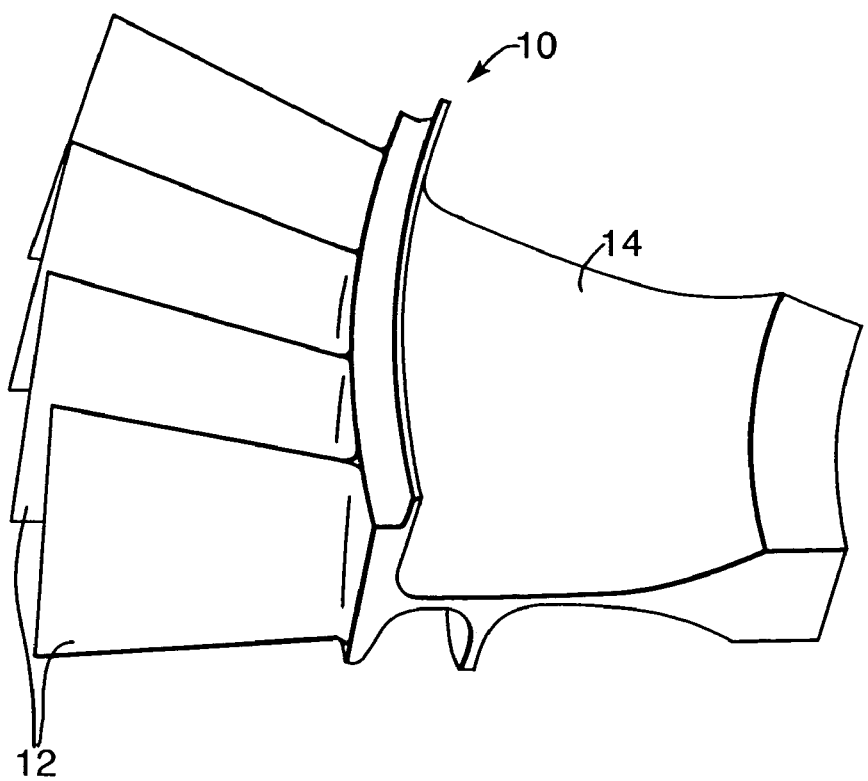
FIG. 1 is a diagrammatic perspective view of the prior art blisk.

Referring to FIG. 1, there is illustrated an aerofoil blisk 10 which may be used in the compressor or turbine of an aero engine. The blisk 10 includes a plurality of blades 12 attached to a disc 14 so as to extend radially outwardly therefrom. The blades 12 are typically of titanium, nickel or steel and are attached to the disc by linear friction welding. This involves holding the disc 14 stationary while a blade member (comprising the as yet unmachined/unfinished blade) is oscillated tangentially against the disc 14 under load. The heat generated by the oscillation together with the radially inward load results in a weld between the disc 14 and the blade member, with weld material being extruded from both sides of the joint.

Figure 2:
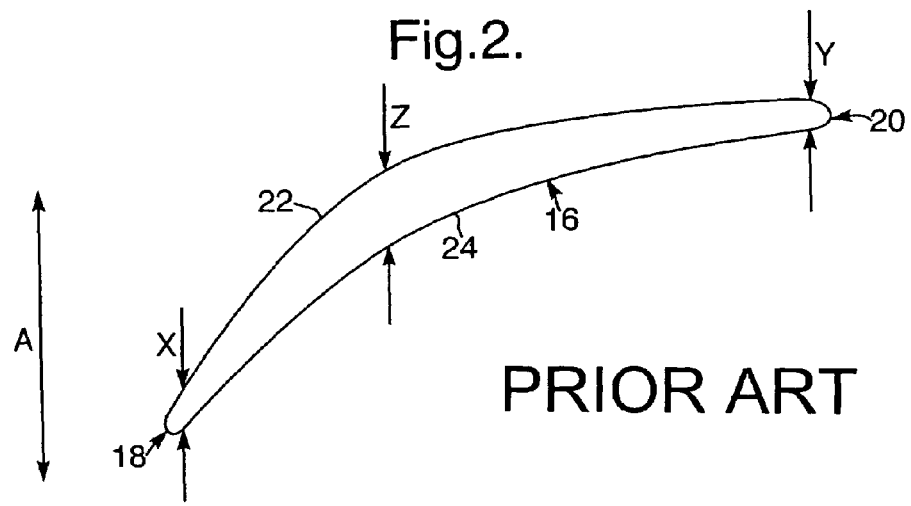
FIG. 2 is a diagrammatic tangential section through a stub of a prior art blade member for joining to a disc to form a blisk.

The radially inner base region of the blade member which contacts the disc 14 for joining thereto by linear friction welding is referred to as a stub. FIG. 2 illustrates in section the shape of a prior art blade stub 16. The section is taken across the length of the blade member, in the tangential direction of the disc when the blade member is attached thereto. The weld oscillation direction is tangential, as indicated by the arrow A.

Referring to FIG. 2 the stub 16 of the blade member includes a leading edge 18 and a trailing edge 20, each being smoothly curved. The stub 16 further includes a suction side 22 and a pressure side 24, each of which curves smoothly between the leading and trailing edges 18 and 20, on its respective side of the blade member.

The curvature of the pressure side 24 is somewhat less than that of the suction side 22 and the stub 16 has a maximum width measured in the weld oscillation direction which is significantly greater in its central region than at its leading edge 18 or trailing edge 20. The arrows X indicate the leading edge width of the blade, the arrows Y the trailing edge width of the blade and the arrows Z the maximum weld width. The ratio of the maximum weld width to the minimum weld width is more than 2. This ratio is referred to as the taper ratio.

It has been appreciated by the inventors that having a relatively high taper ratio causes problems with the friction welding process. As the linear friction welding process takes place, "flash" material is pushed out to the sides of the weld (i.e. it is burnt off) As the material is pushed out, the radially inward pressure (the forge pressure) forces the blade member in the radially inward direction. The burn-off rate of material is higher in the regions where the stub is relatively narrow in the weld oscillation direction. The inventors have found that in these regions the blade member does not move in the radially inward direction fast enough to keep up with the rate of burning off of material. This is because the material in the wider regions of the blade stub prevents such radially inward movement (the burn-off rate being lower in these regions). This can result in the recirculation of flash in the narrower regions and even in voids in the weld. Recirculation is damaging to the weld quality/integrity.

Increasing the forge pressure can help with the above problem but there are limits to the pressures that can be provided by available machinery.

Figure 3:
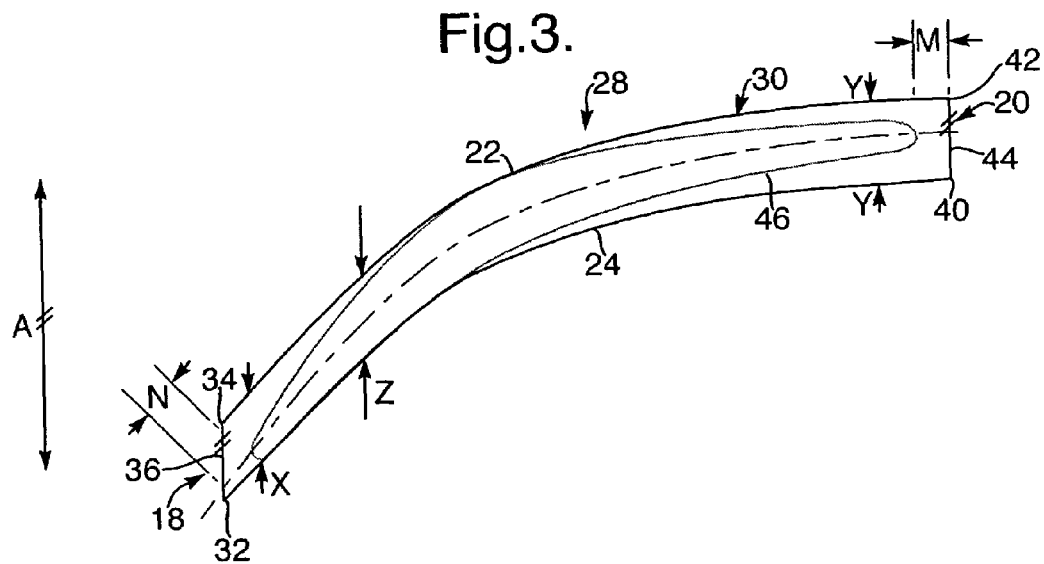
FIG. 3 is a diagrammatic sectional view through a stub of a blade member according to the invention.

Referring to FIG. 3, there is illustrated in section a blade member 28 including a blade stub 30 of an improved shape. The blade stub 30 forms the base of the blade member 28 which is to be attached by linear friction welding to a disc, for subsequent machining to form a blade of a blisk. The stub 30 has a leading edge 18 and a trailing edge 20, joined by suction and pressure sides 22 and 24, as in the prior art. However, the shape of the stub is significantly modified.

The stub 30 is formed such that its taper ratio is ideally less than 1.5. Thus the leading edge 18 and trailing edge 20 are significantly wider in the weld oscillation direction (see arrow A) than in the prior art. Further, the leading edge 18 includes sharp corners 32 and 34 joined by a straight edge 36. The edge 36 is generally parallel to the weld oscillation direction. The trailing edge 20 includes sharp corners 40 and 42 joined by a straight edge 44, the straight edge 44 being generally parallel to the weld oscillation direction. The shape of the stub 30 ensures that there are no regions in which the width in the weld oscillation direction is significantly smaller than in any other region. The leading edge width indicated by the arrows X, the trailing edge width indicated by the arrows Y and the maximum width indicated by the arrows Z are all roughly equal. This minimises the problems associated with non uniform burn-off.

Figure 4:
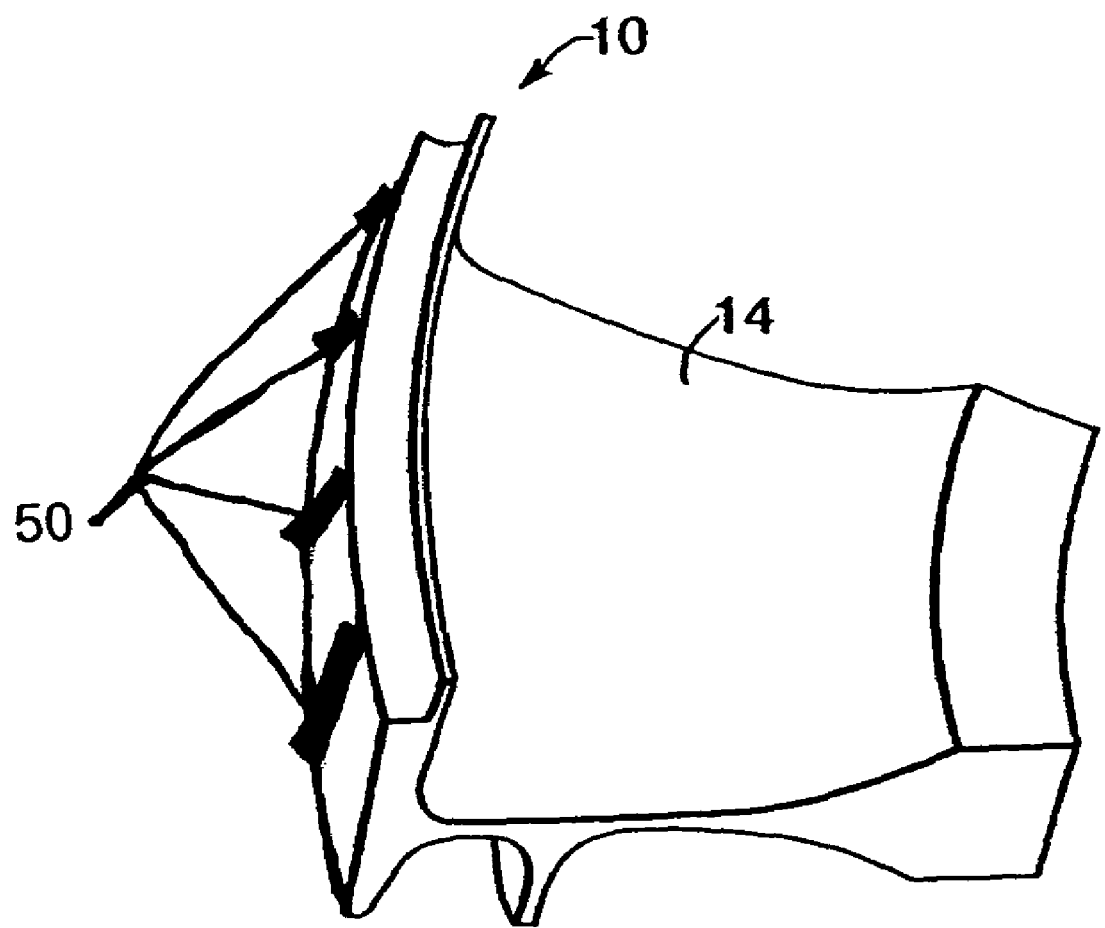
FIG. 4 is a diagrammatic perspective view of a blisk according to the present invention.

As illustrated in FIG. 4, the disc 14 would include projections 50 of the same sectional shape as the blade stubs, to which the stubs would be welded.

Once the stub 30 has been welded to the disc, the excess material may be machined away from the blade member 28 to form the blade (see the material indicated by arrows M and N). The outline geometry of the stub 30 is defined so as to minimise the camber of the stub, thus minimising amount of material to be machined off, whilst still keeping the taper ratio low. The ultimate blade shape is indicated by the faint line 46.

According to the preferred embodiment, there is thus provided a method of producing an aerofoil blisk which reduces the problems of the prior art. The stub design increases the expulsion of surface contaminants to produce high integrity joints.

Various modifications may be made to the above described embodiment without departing from the scope of the invention. Whilst the taper ratio is preferably less than 1.5, it may be higher than this if the forge pressure is high. A taper ratio of 1.6 is a reasonable target. The forge pressure would typically be 100-120 Mpa for a taper ratio of 1.6.

We claim:

1. A method of making an aerofoil blisk comprising a plurality of aerofoil blades joined to a disc to extend radially outwardly therefrom, the method including the steps of:

forming a blade member having a stub for joining to the disc, the stub being shaped with flat ends and having a wide and a narrow section across the length of the blade member, the ratio of the widest to the narrowest part of the stub being less than 2 to reduce the camber of the stub;

joining the stub of the blade member to the disc by linear friction welding involving oscillating the blade member tangentially relative to the disc; and machining excess material from the blade member to form the blade member wherein both an end of the leading edge region and an end of the trailing edge region of the stub are defined by a straight edge which is substantially parallel to the oscillation directions wherein the leading and trailing edges of the stub include sharp corners wherein said straight edge extends between said sharp corners.

2. A method according to claim 1, further including the step of forming the disc with a projection to which the stub is to be joined, the projection having the same sectional shape as the stub.

3. A method according to claim 1, wherein the blade member is formed such that the ratio of the widest to the narrowest part of the stub is less than 1.8.

4. A method according to claim 3, wherein the ratio of the widest to the narrowest part of the stub is less than 1.5.

* * * * *